United States Patent
Miyazaki et al.

(10) Patent No.: US 6,485,392 B2
(45) Date of Patent: Nov. 26, 2002

(54) SHIFT CONTROL SYSTEM FOR BELT-TYPE CONTINUOUSLY VARIABLE TRANSMISSION

(75) Inventors: Tetsushi Miyazaki, Wako (JP); Shigeru Kanehara, Wako (JP); Hideo Koyama, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/908,981

(22) Filed: Jul. 20, 2001

(65) Prior Publication Data

US 2002/0025881 A1 Feb. 28, 2002

(30) Foreign Application Priority Data

Jul. 24, 2000 (JP) .................................. 2000-222453
Jul. 25, 2000 (JP) .................................. 2000-223684

(51) Int. Cl.[7] .................... B60R 41/12; F16H 59/00; F16H 61/00; F16H 63/00
(52) U.S. Cl. .................... 477/44; 477/46; 474/11; 474/28
(58) Field of Search .................... 477/44, 46, 109, 477/110; 474/11, 12, 17, 24, 28

(56) References Cited

U.S. PATENT DOCUMENTS 5,427,579 A * 6/1995 Kanehara et al. ............ 474/28
5,569,114 A * 10/1996 Matsuda et al. ............. 477/45
6,336,888 B1 * 1/2002 Eguchi ....................... 477/3
6,379,282 B1 * 4/2002 Aoki ....................... 477/109

FOREIGN PATENT DOCUMENTS

JP          9-72397          3/1987

* cited by examiner

Primary Examiner—Sherry Estremsky
Assistant Examiner—Tisha D. Lewis
(74) Attorney, Agent, or Firm—Arent Fox Kintner Plotkin & Kahn, PLLC (57) ABSTRACT

A shift control system comprises a diameter-change calculation which calculates the difference between the diameters of the contact circles at present and after a shift to a target speed change ratio and a slip prevention thrust calculation which calculates a slip prevention thrust necessary for transmitting the power through a V belt without slip between the V belt and the drive and driven pulleys. A speed ratio maintaining thrust calculation which calculates a speed ratio maintaining thrust that is an addition to the slip prevention thrust for maintaining the current speed change ratio in constant condition and for transmitting the power without any slip of the belt and a additional thrust calculation which calculates a shifting additional thrust that is added for a contact-circle enlarging pulley to achieve a shift to the target speed change ratio.

14 Claims, 10 Drawing Sheets

SHIFT CONTROL SYSTEM FOR BELT-TYPE CONTINUOUSLY VARIABLE TRANSMISSION

RELATED APPLICATIONS

This application claims the priorities of Japanese Patent Application No.2000-223684 filed on Jul. 25, 2000, and No.2000-222453 filed on Jul. 24, 2000, which are incorporated herein by reference.

FIELD OF THE INVENTION

The present invention relates generally to a belt-type continuously variable transmission comprising a V belt wound around drive and driven pulleys whose widths are variable, and particularly to a shift control system which controls thrusts directed axially onto the drive and driven pulleys for the speed ratio change of the belt-type continuously variable transmission.

BACKGROUND OF THE INVENTION

Many types of such transmissions and shift control systems have been proposed, and some are now in practical use. A typical belt-type continuously variable transmission comprises a drive-side actuator, which is used for adjusting the width of the drive pulley (in axial thrust control), and a driven-side actuator, which is used for adjusting the width of the driven pulley (in axial thrust control). In the speed ratio change of the transmission, these actuators are controlled to act on the respective pulleys axially with thrusts that are appropriate for the drive and driven pulleys to achieve their proper pulley widths.

For the purpose of achieving automatic speed ratio change, various belt-type automatic transmissions have been proposed with shift control systems that are designed to control the thrusts of such actuators in correspondence to the driving condition of the vehicle. For example, such a belt-type automatic transmission is disclosed in Japanese Laid-Open Patent Publication No. H9(1997)-72397. In this transmission, for the speed ratio change, the axial thrust of one pulley is controlled to a target thrust value while the thrust of the other pulley is adjusted to a value that is a product of the target thrust value and a pulley thrust ratio or to a value that is the sum of a value which corresponds to the ratio and a value which corresponds to the deviation of the rotational speed of the engine.

Various apparatus or devices and methods have been also proposed to control the speed ratio change of respective belt-type continuously variable transmissions. However, these prior-art systems and methods have experienced problems of inferior responsivity and convergency because of constant gains seen in control feedbacks for both upshifts and downshifts or of inappropriate parameters set as feedback.

SUMMARY OF THE INVENTION

It is an object of the present invention to provide a shift control system which can control the axial thrusts of the pulleys to optimal values for the speed ratio change of a belt-type continuously variable transmission.

It is another object of the present invention to provide a shift control system which can control the axial thrust of the pulleys to least values necessary for the speed ratio change of a belt-type continuously variable transmission.

To achieve these objectives, the present invention provides a shift control system which controls the axial thrusts generated by drive-side and driven-side actuators (for example, the drive-side cylinder chamber 6 and the driven-side cylinder chamber 9 described in the following preferred embodiment), respectively, to vary the widths of the drive and driven pulleys for achieving a shift to a target speed change ratio. The shift control system comprises contact-circle enlarging pulley determination means (for example, refer to Step S51 described in the following embodiment) and additional thrust calculation means (for example, refer to Step S5 described in the following embodiment). The contact-circle enlarging pulley determination means determines which pulley, i.e., the drive pulley or the driven pulley, is to be the contact-circle enlarging pulley whose diameter of the belt-contact circle is enlarged during the shift, and the additional thrust calculation means calculates a shifting additional thrust which is added for the contact-circle enlarging pulley to shift the transmission to the target speed change ratio. Preferably, the shifting additional thrust is set inversely proportional to the running speed of the V belt.

While the speed of the V belt is high, if the pulley widths were varied quickly, then the resulting shift would be too rapid. However, if the speed of the shift is controlled in inverse proportion to the running speeds of the V belt, then a shift control appropriate for comfortable travelling is possible. Therefore, the shift control system according to the present invention sets the shifting additional thrust inversely proportional to the running speed of the V belt and realizes a good shift control.

Furthermore, it is preferable that the shifting additional thrust be set proportional to the difference between the diameter of the contact circle of the contact-circle enlarging pulley at present and the diameter of the contact circle of the contact-circle enlarging pulley after the shift to the target speed change ratio. The larger the diameter difference between the belt-contact circles of the contact-circle enlarging pulley before and after the shift, faster the speed of the shift being required. If the speed of the shift is controlled proportionally to the diameter difference between the belt-contact circles, then a shift control appropriate for comfortable travelling is possible. Therefore, the shift control system according to the present invention sets the shifting additional thrust proportional to the diameter difference between the belt-contact circles and realizes a better shift control.

The shift control system can also comprise belt-speed calculation means, which calculates the running speed of the V belt, and first gain coefficient calculation means, which calculates a first gain coefficient in inverse proportion to the running speed of the V belt. In this case, the additional thrust calculation means uses the first gain coefficient for calculating the shifting additional thrust.

Furthermore, the shift control system may comprise belt-speed calculation means, which calculates the running speed of the V belt, and first gain coefficient calculation means, which calculates a first gain coefficient in inverse proportion to the running speed of the V belt, from the rotational speed of the drive pulley and the current speed change ratio. Then, the additional thrust calculation means uses the first gain coefficient for calculating the shifting additional thrust.

According to the present invention, the shifting additional thrust, which is added for the contact-circle enlarging pulley to achieve a shift to a target speed change ratio, can be set proportional to the difference between the diameter of the contact circle of the contact-circle enlarging pulley at present and the diameter of the contact circle of the contact-circle enlarging pulley after the shift to the target speed change ratio.

While the diameter difference between the belt-contact circles of the contact-circle enlarging pulley before and after a shift is relatively large, then the shift needs to be carried out comparatively fast. However, if the speed of the shift is controlled proportionally to the diameter difference, then the shift control can be executed smoothly. Therefore, the shift control system according to the present invention sets the shifting additional thrust proportional to the diameter difference and realizes a good shift operation.

Also, the shift control system may comprise diameter-change calculation means, which calculates the difference between the diameters of the contact circles of the contact-circle enlarging pulley at present and after a shift, and second gain coefficient calculation means, which calculates a second gain coefficient in proportion to the difference between the diameters of the contact circles. In this case, the additional thrust calculation means uses the second gain coefficient for calculating the shifting additional thrust.

It is preferable that the difference between the diameters of the contact circles of the contact-circle enlarging pulley at present and after a shift to a target speed change ratio be calculated from the current speed change ratio and the difference between the rotational speeds of the drive pulley at the current speed change ratio and at the target speed change ratio.

The above described features of the shift control system are realized specifically in the following arrangement. A shift control system according to the present invention controls the axial thrusts generated by drive-side and driven-side actuators (for example, the drive-side and driven-side cylinder chambers 6 and 9 described in the following embodiment), respectively, to vary the widths of the drive and driven pulleys for achieving a shift to a target speed change ratio. The shift control system comprises belt-speed calculation means (for example, refer to Step S52 described in the following embodiment), which calculates the running speed of the V belt; contact-circle enlarging pulley determination means (for example, refer to Step S51 described in the following embodiment), which determines whether the drive pulley or the driven pulley is to be the contact-circle enlarging pulley; diameter-change calculation means (for example, refer to Step S54 described in the following embodiment), which calculates the difference between the diameters of the contact circles of the contact-circle enlarging pulley at present and after the shift; slip prevention thrust calculation means (for example, refer to Step S1 described in the following embodiment), which calculates a slip prevention thrust necessary for transmitting the power through the V belt without slip between the V belt and the drive and driven pulleys; speed ratio maintaining thrust calculation means (for example, refer to Step S2 described in the following embodiment), which calculates a speed ratio maintaining thrust that is added to the slip prevention thrust, for maintaining the current speed change ratio in constant condition and for transmitting the power without any slip of the belt; and additional thrust calculation means (for example, refer to Step S5 described in the following embodiment), which calculates a shifting additional thrust that is added for the contact-circle enlarging pulley to shift the transmission to the target speed change ratio, the shifting additional thrust being set inversely proportional to the running speed of the V belt, which is determined by the belt-speed calculation means, and set proportional to the difference between the diameters of the contact circles of the contact-circle enlarging pulley.

While the speed of the V belt is high, if the pulley widths were varied quickly, then the resulting shift would be too rapid. However, if the speed of the shift is controlled in inverse proportion to the running speed of the V belt, then a shift control appropriate for comfortable travelling is possible. Also, the larger the diameter difference between the belt-contact circles of the contact-circle enlarging pulley before and after the shift, faster the speed of the shift being required. However, if the speed of the shift is controlled proportionally to the diameter difference between the belt-contact circles, then a shift control appropriate for comfortable travelling is possible. Therefore, the shift control system according to the present invention sets the shifting additional thrust inversely proportional to the running speed of the V belt and proportional to the diameter difference between the belt-contact circles and thereby realizes an optimal shift control.

Preferably, a first gain coefficient that is inversely proportional to the running speed of the V belt, which is determined by the belt-speed calculation means, is calculated from the rotational speed of the drive pulley and the current speed change ratio, and a second gain coefficient that is proportional to the difference between the diameters of the belt-contact circles is calculated from the current speed change ratio and from the difference between the rotational speeds of the drive pulley at the current speed change ratio and after the shift to the target speed change ratio. Then, the shifting additional thrust can be calculated on the basis of the first and second gain coefficients. As the calculation of the first and second gain coefficients is relatively simple and easy, the shifting additional thrust can be calculated easily.

Also, for varying the widths of the drive and driven pulleys and achieving a shift to a target speed change ratio, a shift control system may comprise contact-circle enlarging pulley determination means (for example, refer to Step S51 described in the following embodiment), which determines whether the drive pulley or the driven pulley is to be the contact-circle enlarging pulley whose diameter of the belt-contact circle is enlarged during the shift; slip prevention thrust calculation means (for example, refer to Step S1 described in the following embodiment), which calculates a slip prevention thrust necessary for transmitting the power through the V belt without slip between the V belt and the drive and driven pulleys; and additional thrust calculation means (for example, refer to Step S5 described in the following embodiment), which calculates a shifting additional thrust that is added for the contact-circle enlarging pulley to shift the transmission to the target speed change ratio. In this case, for the shift, the axial thrust for the contact-circle contracting pulley is set to the slip prevention thrust, and the axial thrust for the contact-circle enlarging pulley is set to a thrust that is calculated by adding to the shifting additional thrust a product which is obtained by multiplying the slip prevention thrust by the ratio of the thrusts for the drive and driven pulleys, respectively, obtained in constant condition.

Also, a shift control system may comprise contact-circle enlarging pulley determination means (for example, refer to Step S51 described in the following embodiment), which determines whether the drive pulley or the driven pulley is to be the contact-circle enlarging pulley whose diameter of the belt-contact circle is enlarged during a shift to a target speed change ratio; slip prevention thrust calculation means (for example, refer to Step S1 described in the following embodiment), which calculates a slip prevention thrust necessary for transmitting the power through the V belt without slip between the V belt and the drive and driven pulleys; and additional thrust calculation means (for example, refer to Step S5 described in the following embodiment), which calculates a shifting additional thrust that is added for the contact-circle enlarging pulley to achieve the shift. In this shift control system, for the shift, the axial thrust for the contact-circle enlarging pulley may be set to the slip prevention thrust, and the axial thrust for the contact-circle contracting pulley may be set to a thrust that is calculated by multiplying the result obtained by subtracting the shifting additional thrust from the slip prevention thrust by the ratio of the thrusts for the drive and driven pulleys, respectively, obtained in constant condition.

In this way, the thrusts applied to the drive and driven pulleys in the shift control are always minimized with the smaller of these thrusts being the slip prevention thrust, and the magnitude of the larger thrust is determined with respect to the smaller thrust for achieving a desired shift. As a result, a relatively small energy is required to generate the thrusts applied to the drive and driven pulleys in the shift control, and fuel efficiency is improved.

For a more specific shift control system according to the present invention, the following arrangement may be adopted. A shift control system according to the present invention controls the axial thrusts generated by drive-side and driven-side actuators (for example, the drive-side and driven-side cylinder chambers 6 and 9 described in the following embodiment), respectively, to vary the widths of the drive and driven pulleys for achieving a shift to a target speed change ratio. This shift control system comprises contact-circle enlarging pulley determination means (for example, refer to Step S51 described in the following embodiment), which determines whether the drive pulley or the driven pulley is to be the contact-circle enlarging pulley whose diameter of the belt-contact circle is enlarged by the adjustment of the width thereof during the shift; slip prevention thrust calculation means (for example, refer to Step S1 described in the following embodiment), which calculates a slip prevention thrust necessary for transmitting the power through the V belt without slip between the V belt and the drive and driven pulleys; speed ratio maintaining thrust calculation means (for example, refer to Step S2 described in the following embodiment), which calculates a speed ratio maintaining thrust that is added to the slip prevention thrust of either the drive pulley or the driven pulley, for maintaining the current speed change ratio in constant condition and for transmitting the power without any slip of the belt; additional thrust calculation means (for example, refer to Step S5 described in the following embodiment), which calculates a shifting additional thrust that is added for the contact-circle enlarging pulley to shift the transmission to the target speed change ratio; basic shift control thrust calculation means (for example, refer to Step S61 described in the following embodiment), which calculates basic shift control thrusts from the slip prevention thrust, the speed ratio maintaining thrust and the shifting additional thrust, the basic shift control thrusts being to be applied to the drive and driven pulleys for the shift to the target speed change ratio; and shift control thrust correction means (for example, refer to Step S63 and Step S65 described in the following embodiment), which executes a correction in which the basic shift control thrusts are reduced until the thrust for either the drive pulley or the driven pulley becomes equal to the slip prevention thrust with the thrust for the other pulley being equal to or greater than the slip prevention thrust.

In this shift control system, the basic shift control thrusts are calculated from the slip prevention thrusts, the speed ratio maintaining thrust and the shifting additional thrust. If the basic shift control thrusts are applied for the shift control, then a shift to a target speed change ratio can be executed appropriately without any slip between the V belt and the pulleys. However, the basic shift control thrusts calculated in this way can become greater than the slip prevention thrusts for both the drive and driven pulleys. If such a case occurs, then, both the thrusts are reduced until either reaches the respective slip prevention thrust. The thrusts reduced in this way can be used for the shift control to achieve the same result. As a result, the levels of the thrusts can be reduced as a whole. According to the present invention, this reduction correction is executed by the shift control thrust correction means, so that a relatively small energy is required to generate the thrusts applied to the drive and driven pulleys for the shift control. This improves fuel efficiency.

As the basic shift control thrusts are calculated from the slip prevention thrusts, the speed ratio maintaining thrust and the shifting additional thrust, preferably, the shift control system may be arranged to execute a correction in which the thrust that corresponds to the speed ratio maintaining thrust is subtracted from the basic shift control thrusts or in which the thrust that corresponds to the shifting additional thrust is subtracted from the basic shift control thrusts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DESCRIPTION OF THE PREFERRED EMBODIMENTS

Figure 1:
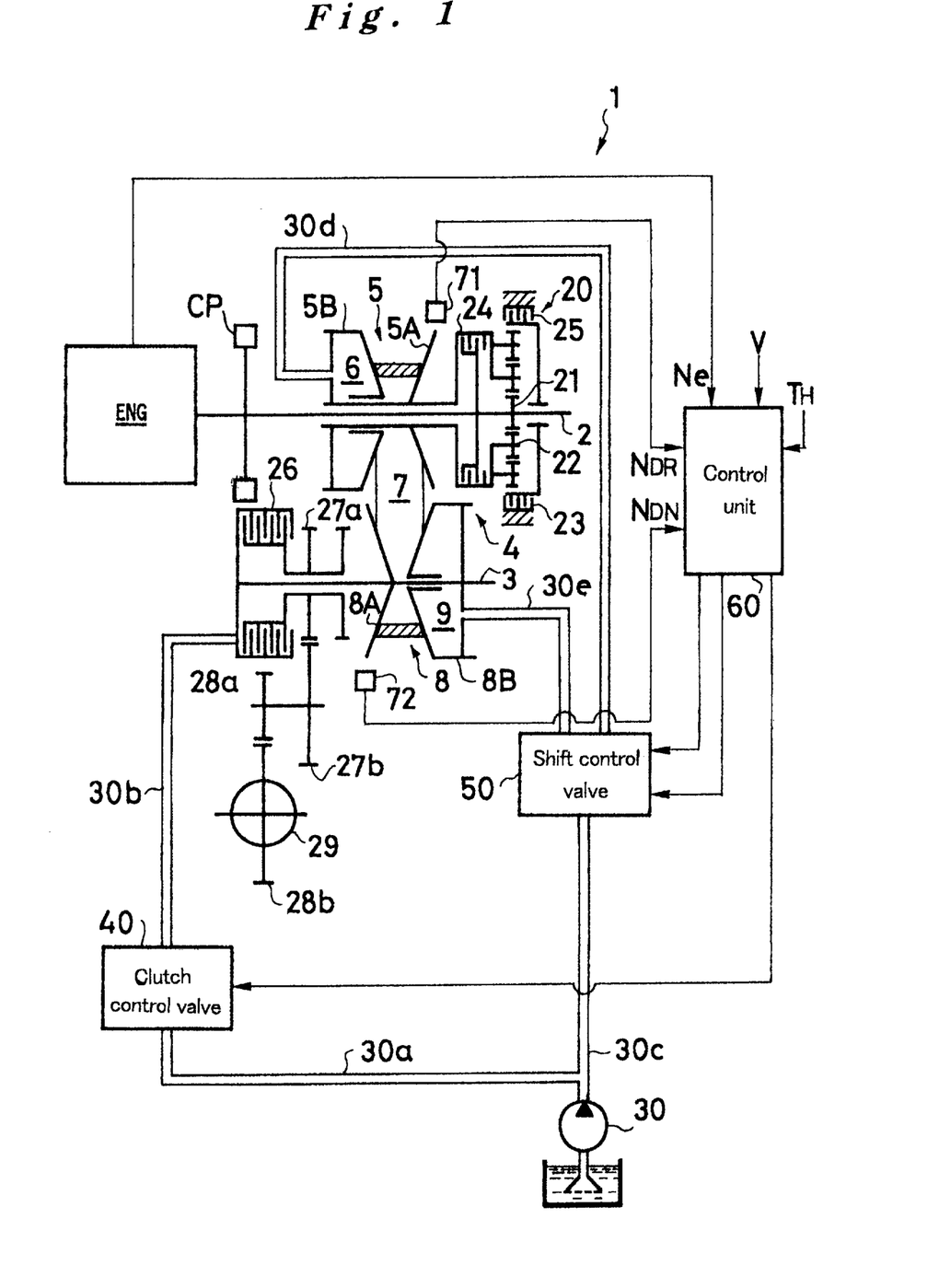
FIG. 1 is a schematic diagram illustrating the construction of a belt-type continuously variable transmission which incorporates a shift control system according to the present invention.

A preferred embodiment of the present invention is described in reference to the drawings. FIG. 1 shows the whole construction of a belt-type continuously variable transmission 1 according to the present invention. This belt-type continuously variable transmission (CVT) 1 comprises an input shaft 2, a countershaft 3, a metal V-belt mechanism 4, and a planetary gear type forward-reverse switching mechanism 20, and a starting clutch 26. The input shaft 2 is connected through a damper mechanism CP to an engine ENG, and the countershaft 3 is disposed in parallel with the input shaft 2. The metal V-belt mechanism 4 is disposed between and around these shafts 2 and 3. The planetary gear type forward-reverse switching mechanism 20 is disposed around the input shaft 2 while the starting clutch 26 is disposed around the countershaft 3.

The belt-type continuously variable transmission 1 further comprises a hydraulic pump 30, a clutch control valve 40 and a shift control valve 50. The hydraulic pump 30 supplies oil to oil passages 30a~30e, and the clutch control valve 40 controls the flow of the oil to the starting clutch 26 for controlling the starting clutch 26 while the shift control valve 50 controls the flow of the oil to the metal V-belt mechanism 4 for the shift control of the transmission.

The metal V-belt mechanism 4 comprises a drive pulley 5, a driven pulley 8 and a metal V belt 7. The drive pulley 5 is disposed rotatably on the input shaft 2 while the driven pulley 8 is fixed on the countershaft 3 so that the driven pulley 8 rotates together with the countershaft 3 as a unit. The metal V belt 7 is disposed between and around these pulleys 5 and 8.

The drive pulley 5 comprises a stationary pulley half 5A and a movable pulley half 5B. The stationary pulley half 5A is disposed rotatably on the input shaft 2, and the movable pulley half 5B is movable axially with respect to the stationary pulley half 5A. The drive pulley 5 further comprises a drive-side cylinder chamber 6, which is provided on one side of the movable pulley half 5B. The pressure of the oil supplied from the shift control valve 50 through the oil passage 30d into the drive-side cylinder chamber 6 generates a thrust in the axial direction of the pulley (drive pulley axial thrust), and this thrust moves the movable pulley half 5B axially.

The driven pulley 8 comprises a stationary pulley half 8A and a movable pulley half 8B. The stationary pulley half 8A is fixed on the countershaft 3, and the movable pulley half 8B is movable axially with respect to the stationary pulley half 8A. The driven pulley 8 further comprises a driven-side cylinder chamber 9, which is provided on one side of the movable pulley half 8B. The pressure of the oil supplied from the shift control valve 50 through the oil passage 30e into the driven-side cylinder chamber 9 generates a thrust in the axial direction of the pulley (driven pulley axial thrust), and this thrust moves the movable pulley half 8B axially.

The hydraulic pressures (pulley thrust pressures) of the drive-side cylinder chamber 6 and the driven-side cylinder chamber 9 are controlled to adjust the thrusts, so that the widths of the drive and driven pulleys 5 and 8 are adjusted without any slippage of the metal V belt 7 (referred to as "slip prevention thrust"). While the widths of the pulleys are being varied in this way, the radii of the contact circles of the metal V belt 7 around the pulleys 5 and 8 are changed continuously. As a result, the speed change ratio of the transmission is varied continuously without any step.

The planetary gear type forward-reverse switching mechanism 20 comprises a forward drive clutch 24 and a double pinion type planetary gear mechanism, which includes a sun gear 21, a carrier 22 and a ring gear 23. The sun gear 21 is connected to the input shaft 2 of the transmission, and the carrier 22 is connected to the stationary pulley half 5A of the drive pulley 5. The ring gear 23 is arranged to be fixed stationary by a rearward drive brake 25, and the forward drive clutch 24 is arranged to couple the sun gear 21 with the ring gear 23. With this construction, when the forward drive clutch 24 is actuated for engagement, the carrier 22 and the ring gear 23 are held together to the sun gear 21, which is connected to the input shaft 2 of the transmission. As a result, they rotate together with the input shaft 2 as one unit, so the drive pulley 5 rotates in the same direction as the input shaft 2 (in the forward drive direction). On the other hand, when the rearward drive brake 25 is actuated for engagement, the ring gear 23 is held stationary. As a result, the carrier 22 rotates in the direction opposite to that of the sun gear 21 (in the rearward drive direction).

The starting clutch 26 is used to control the power transmission between the countershaft 3 and the output member (for example, gear 27a) of the transmission. The engaging and disengaging actions of the starting clutch 26 are controlled to control the power transmission, and the power is transmitted through gears 27a, 27b, 28a and 28b to a differential mechanism 29 and then divided therein to rotate right and left wheels (not shown). When the starting clutch 26 is released, the transmission is set in neutral. In this condition, no power is transmitted.

As mentioned above, the shift control valve 50 is used to control the hydraulic pressures supplied to the drive-side cylinder chamber 6 and the driven-side cylinder chamber 9, respectively, for achieving the shift of the transmission. Also, the clutch control valve 40 is used to control the hydraulic pressure supplied to the starting clutch 26 for starting the vehicle. The actuation of the clutch control valve 40 and the shift control valve 50 themselves is controlled by a control unit 60, which sends control signals to these valves.

The present invention relates to the shift control of the transmission, so a detailed description is given of the actuation of the shift control valve 50 that is controlled by the control unit 60, i.e., the shift control of the transmission. The shift control valve 50 comprises two solenoid valves which control the hydraulic pressures supplied to the drive-side cylinder chamber 6 and the driven-side cylinder chamber 9, respectively. The control unit 60 sends signals to these two solenoid valves and controls the actuation of the solenoid valves, thereby achieving the shift control of the transmission (these signals are hereinafter referred to as "shift control signals"). In response to the control signals, the solenoid valves adjust the hydraulic pressures of the drive-side cylinder chamber 6 and the driven-side cylinder chamber 9, respectively, these pressures producing the above mentioned drive and driven pulley axial thrusts in the drive pulley 5 and the driven pulley 8, respectively. For controlling the shift of the transmission, the control unit 60 receives signals that indicate the rotational speed Ne of the engine, the degree of the throttle opening TH, the speed of the vehicle V, the rotational speed of the drive pulley NDR, and the rotational speed of the driven pulley NDN, respectively, these signals representing the condition of the transmission.

The shift control signals are determined in correspondence to the drive and driven axial thrusts FDR and FDN required for achieving a shift. Each thrust FDR or FDN is calculated from a slip prevention thrust F1DR or F1DN, which is necessary for the drive pulley 5 or the driven pulley 8 to transmit the power without slip of the metal V belt 7, a speed ratio maintaining thrust F2DR or F2DN, which is necessary for the present speed ratio Rp to be maintained, and a shifting additional thrust Fa, which is necessary for the present speed ratio Rp to be shifted to a target speed ratio Rt at an optimal rate.

Figure 2:
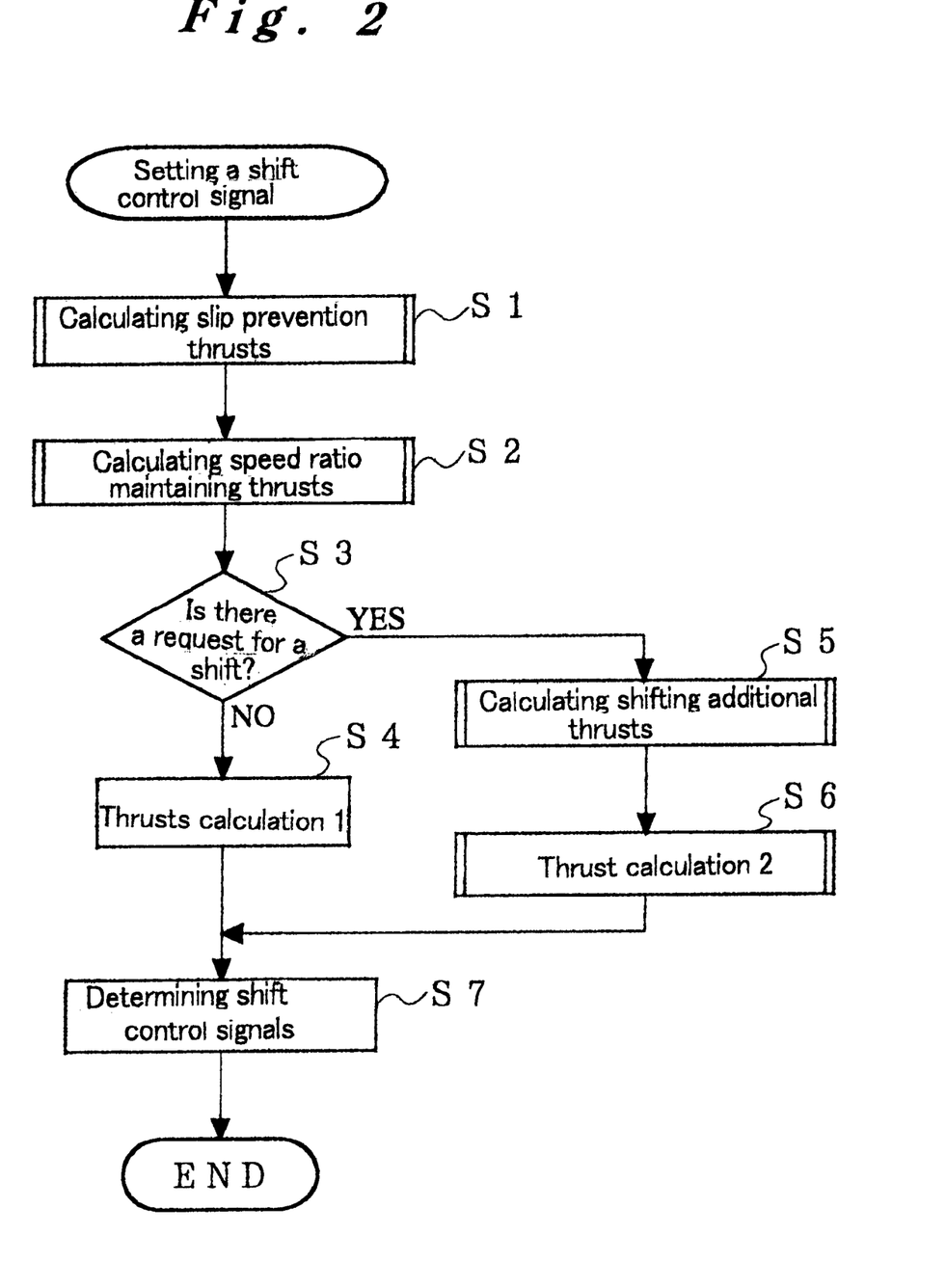
FIG. 2 is a flowchart describing steps for setting a shift control signal, which steps are performed by the shift control system.

Now, a description is made in reference to FIG. 2, which is a flowchart describing steps for calculating an axial thrust and setting a shift control signal. As described in this control flow, slip prevention thrusts F1DR and F1DN are calculated at Step S1, and speed ratio maintaining thrusts F2DR and F2DN are calculated at Step S2. Then, a determination is made whether there is a request for a shift at Step S3. If there is no such request, and the transmission is in constant condition, then the control flow proceeds to Step S4, where a thrust calculation 1 is executed to calculate, from the slip prevention thrusts F1DR and F1DN and the speed ratio maintaining thrusts F2DR and F2DN, the drive and driven axial thrusts FDR and FDN necessary for maintaining the current constant operation.

On the other hand, if there is a request for a shift, then the control flow proceeds to Step S5, where a calculation is made to determine a shifting additional thrust Fa which is necessary for the transmission to respond to the request. Then, at Step S6, from the slip prevention thrusts F1DR and F1DN, the speed ratio maintaining thrusts F2DR and F2DN, and the shifting additional thrust Fa, a thrust calculation 2 is executed to calculate the axial thrusts FDR and FDN which are necessary for realizing the requested shift.

After the drive and driven axial thrusts FDR and FDN are calculated either in the thrust calculation 1 (at Step S4) or in the thrust calculation 2 (at Step S6) as described above, the control flow proceeds to Step S7, where a shift control signal to be sent to the shift control valve 50 is determined for adjusting the hydraulic pressures of the drive and driven-side cylinder chambers 6 and 9 so as to achieve the drive and driven axial thrusts FDR and FDN. This shift control signal is then used to control the operation of the shift control valve 50 in the shift control of the transmission.

Figure 3:
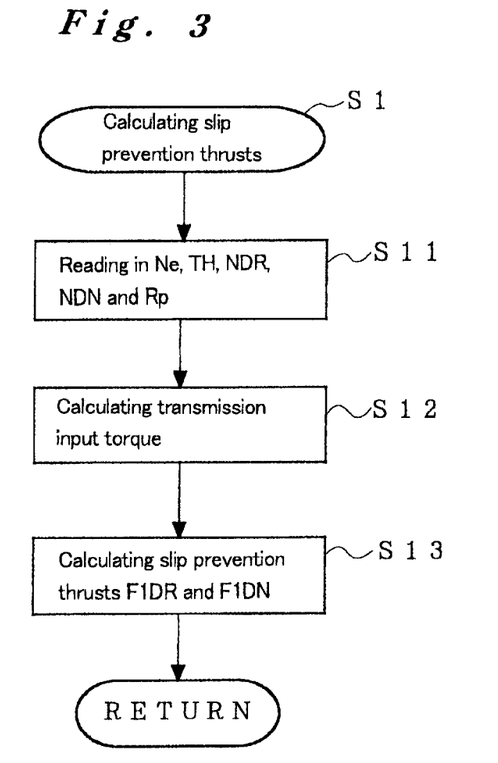
FIG. 3 is a flowchart describing the calculation of a slip prevention thrust, which step is a part of the control flow shown in FIG. 2.

At first, the calculation of the slip prevention thrusts, which is executed at Step S1, is described in detail in reference to FIG. 3. At Step S11, the rotational speed Ne of the engine, the degree of the throttle opening TH, the rotational speed of the drive pulley NDR, the rotational speed of the driven pulley NDN, and the current speed change ratio Rp of the transmission are detected and read in. Then, the torque Tin input from the engine to the transmission through the input shaft 2 is calculated from these detected values, and the torque transmitted to the drive pulley 5 and to the driven pulley 8 is calculated for the speed change ratio Rp at Step S12. Based on this calculation, the slip prevention thrusts F1DR and F1DN, which are necessary for the drive and driven pulleys 5 and 8, respectively, to be rotated without any slip, are then calculated at Step S13.

Figure 4:
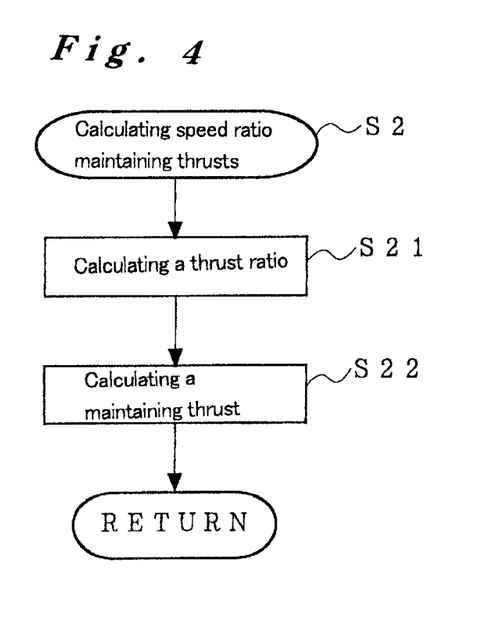
FIG. 4 is a flowchart describing the calculation of a speed ratio maintaining thrust, which step is a part of the control flow shown in FIG. 2.

Now, the calculation of the speed ratio maintaining thrusts, which is executed at Step S2, is described in detail in reference to FIG. 4. Speed ratio maintaining thrust is a thrust that should be applied to maintain the current speed change ratio Rp while the transmission is in constant condition, either to the drive pulley 5 or to the driven pulley 8, which pulleys are under the slip prevention thrusts F1DR and F1DN and are transmitting the power without any slip. The steps for the calculation is detailed in FIG. 4. Here, for example, the slip prevention thrust F1DR is set to provide a transmitted torque capacity Tt (=Ta+T1) which is the sum of the real transmitted torque Ta and a predetermined extra torque T1, and a balance thrust ratio TR is predetermined as shown in FIG. 5 against the reciprocal (1/SF) of the ratio of the transmitted torque capacity Tt to the real transmitted torque Ta, i.e., a safety factor SF (=Tt/Ta), and the speed change ratio Rp.

Figure 5:
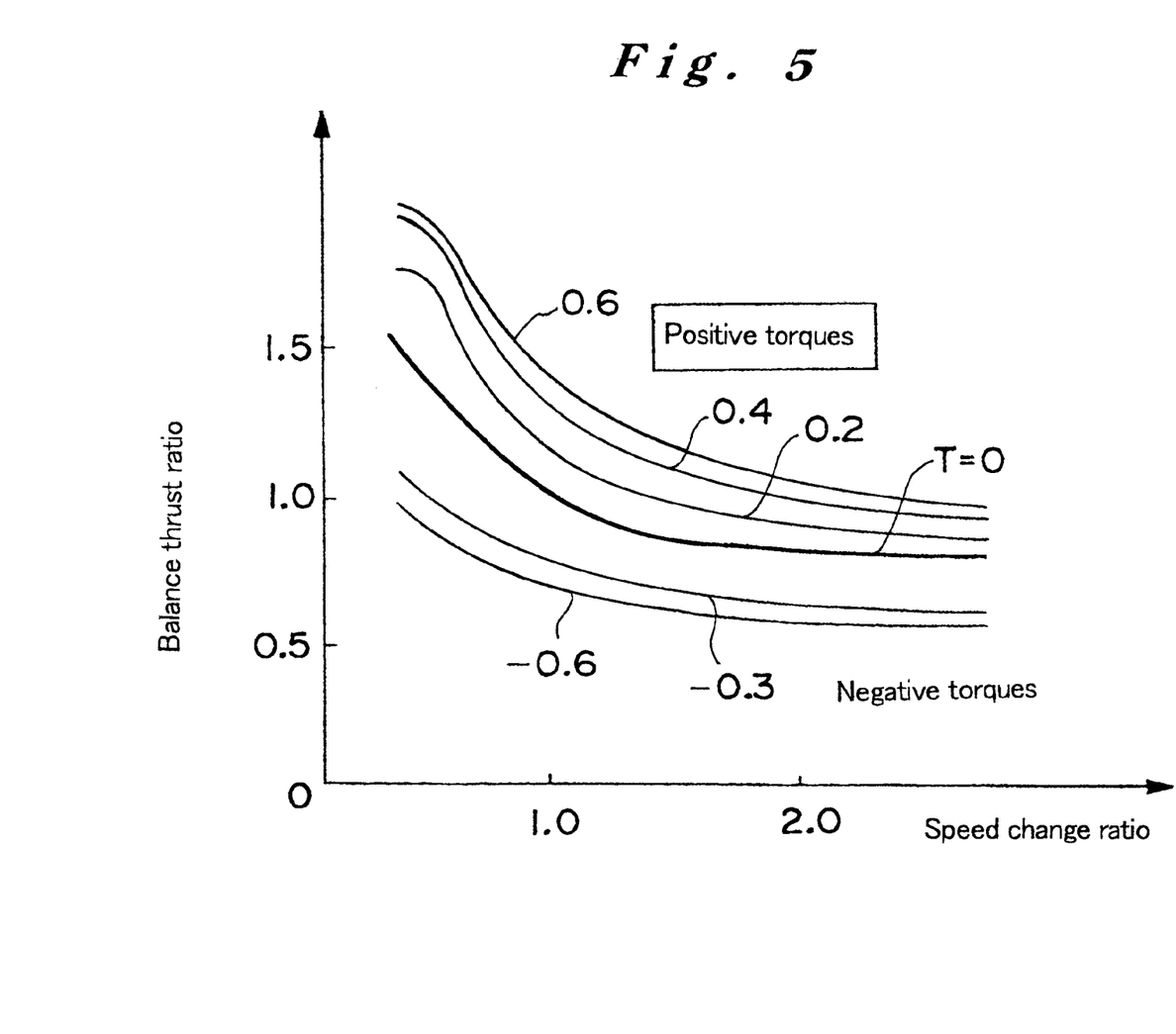
FIG. 5 is a graph describing relations among speed ratios, the reciprocals of safety ratios for the drive pulley, and ratios of balancing thrusts.

In FIG. 5, a line labeled with "T=0" indicates that the transmitted torque is zero. Transmitted torques represented in the region above this line in the graph are positive while those in the region below this line are negative. A positive value means that a driving torque is transmitted from the engine to the output side of the transmission while a negative value means that a driving torque is transmitted from the output side of the transmission to the engine, i.e., an engine brake is effected. The number given to each line in the graph is the reciprocal (1/SF) of a safety factor SF.

The above mentioned balance thrust ratio TR is the ratio of an axial thrust applied to the drive pulley 5 to a corresponding axial thrust applied to the driven pulley 8, which thrusts are for maintaining a predetermined speed change ratio in a constant operation. In FIG. 5, for example, if a balance thrust ratio TR is taken at the current speed change ratio against the line representing the reciprocal (1/SF) of the current safety factor for the drive pulley 5, then this balance thrust ratio TR is the ratio of the axial thrust of the drive pulley 5 to that of the driven pulley 8 which thrusts are necessary for maintaining the current speed change ratio Rp in the present transmitted torque condition.

Figure 6A:
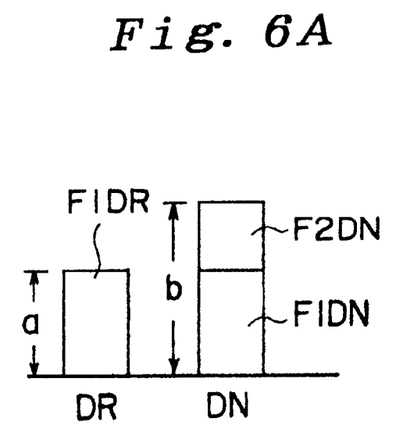
FIGS. 6A and 6B are graphs describing examples, in which slip prevention thrusts for the drive and driven pulleys are added with a speed ratio maintaining thrust.
Figure 6B:
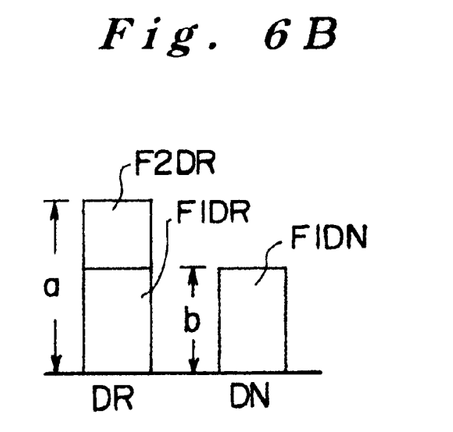

At Step S21 in the calculation flow shown in FIG. 4, the balance thrust ratio TR is calculated as described above, and at Step S22, the thrusts necessary for achieving the balance thrust ratio TR are calculated. In this calculation, either the slip prevention thrust F1DR or the slip prevention thrust F1DN, each of which is calculated at Step S1, is added with a thrust to achieve the balance thrust ratio TR. In other words, the slip prevention thrust F1DR of the drive pulley 5 is added with a speed ratio maintaining thrust F2DR as shown in FIG. 6B, or the slip prevention thrust F1DN is added with a speed ratio maintaining thrust F2DN as shown in FIG. 6A. In this way, at Step S22, the speed ratio maintaining thrust is determined so as to achieve the balance thrust ratio TR, which is determined as described above.

Thus, the slip prevention thrusts F1DR and F1DN are added with the speed ratio maintaining thrust F2DR or F2DN, so that the drive and driven axial thrusts will achieve the balance thrust ratio as shown in FIG. 6A or FIG. 6B. If these axial thrusts are realized for the drive pulley 5 and the driven pulley 8, respectively, the power is transmitted without any slip while the current speed change ratio is maintained in constant condition. It is clear from this that, in the thrust calculation 1, which is executed at Step S4 in the control flow shown in FIG. 2, the drive and driven axial thrusts FDR and FDN are calculated by adding the speed ratio maintaining thrust F2DR or F2DN to the slip prevention thrusts F1DR and F1DN to achieve the balance thrust ratio TR, which is calculated at Step S21.

Figure 7:
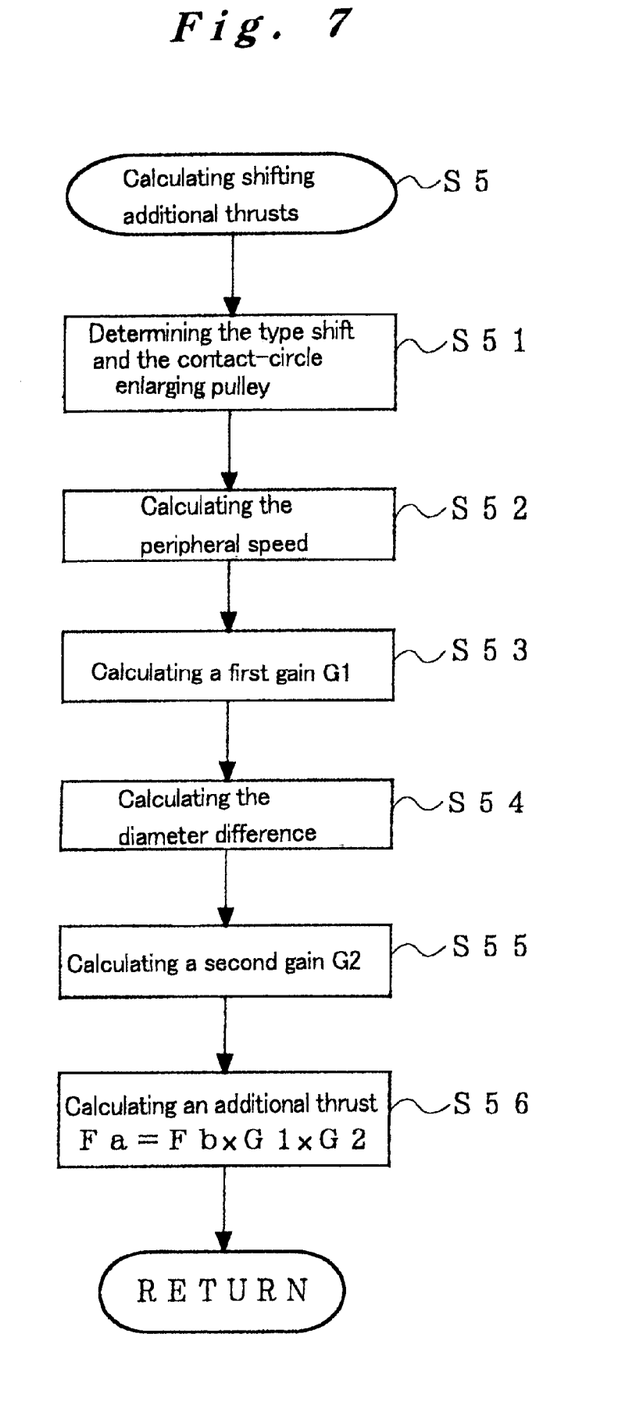
FIG. 7 is a flowchart describing the calculation of a shifting additional thrust, which step is a part of the control flow shown in FIG. 2.

Now, the shifting additional thrust calculation executed at Step S5 is described. This step is detailed in FIG. 7. At first, a determination is made at Step S51 whether the type of the requested shift is an upshift or a downshift and which pulley should acquire an increased diameter for its belt-contact arc. The shift request is determined from the target engine rotational speed, which corresponds to how much the accelerator pedal is pressed down by the driver, i.e., the degree of the throttle opening. For example, when the accelerator pedal is pressed down, the target rotational speed of the engine is increased in response, and a shift is executed to bring the real rotational speed of the engine to the target rotational speed. In the shift control, at first, the request for a shift is determined whether it is an upshift or a downshift at Step S51. At the same time, a determination is made whether the drive pulley 5 or the driven pulley 8 is the pulley whose diameter of the belt-contact arc to be increased in this shift operation (hereinafter referred to as "contact-circle enlarging pulley").

Figure 8:
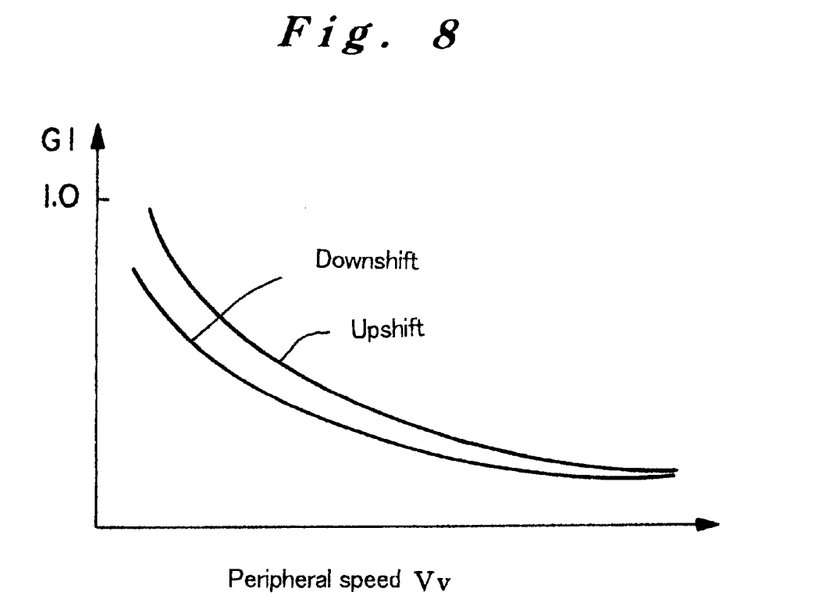
FIG. 8 is a graph describing relations between belt peripheral speed and a first gain.

Then, the running speed of the metal V belt 7, i.e., the peripheral speed of the belt Vv, is calculated from the rotational speed of the drive pulley NDR, the rotational speed of the driven pulley NDN and the speed change ratio Rp at Step S52, and a first gain G1 which corresponds to the peripheral speed Vv is determined from a graph shown in FIG. 8 at Step S53. Values for the first gain G 1 are arranged in inverse proportion to those of the peripheral speed Vv for each type of shifts, i.e., upshifts and downshifts.

Figure 10:
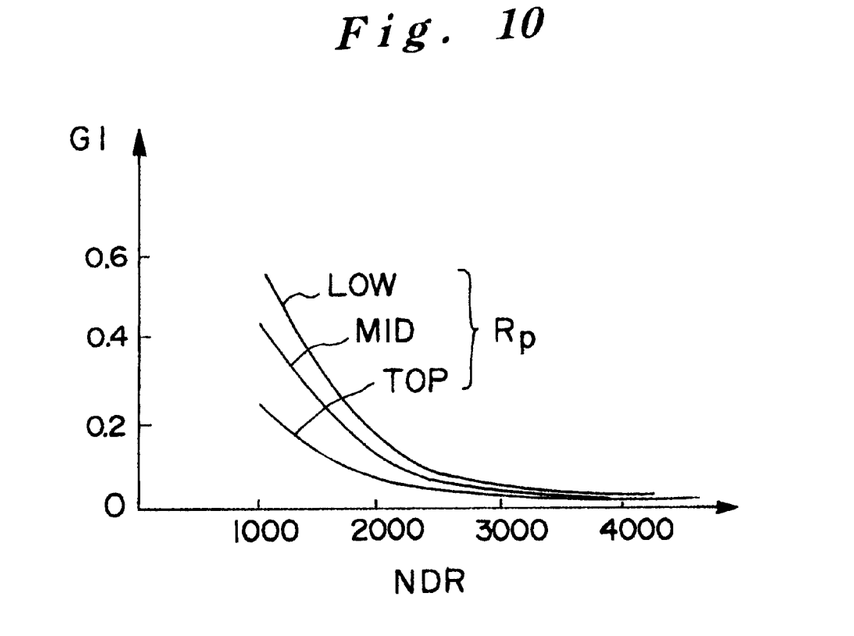
FIG. 10 is a graph describing relations among the rotational speed of the drive pulley, the speed change ratio, and the first gain.

The peripheral speed of the belt Vv is a value that is determined in a relation only between the rotational speed of the drive pulley NDR and the speed change ratio Rp. Therefore, for example, as shown in FIG. 10, the values of the first gain G1 are predetermined against the values of the rotational speed of the drive pulley NDR and the speed change ratio Rp, so the first gain G1 for the current condition can be determined from the relations shown in the graph of FIG. 10. If the first gain G1 is determined in this way, then the calculation of the peripheral speed of the belt Vv, which is executed at Step S52, is not necessary, so there is an advantage of simplifying the control. As described above, the first gain G1 is set in correspondence to the type of the shift. The relations shown in FIG. 10 are for upshifts, and FIG. 10 shows, as examples, the relations only for a minimum speed change ratio TOP, an intermediate speed change ratio MID and a maximum speed change ratio LOW, though many additional lines which represent respective speed change ratios Rp can be drawn.

Figure 9:
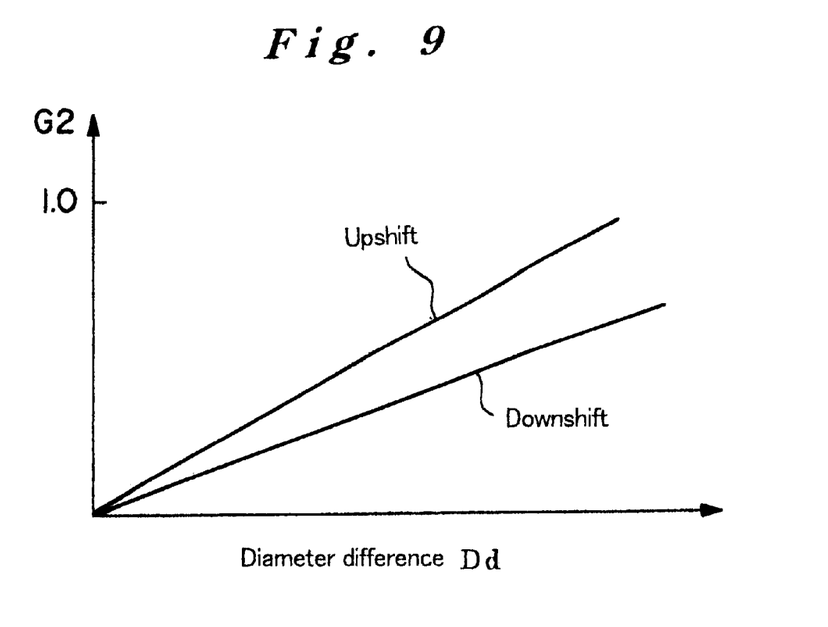
FIG. 9 is a graph describing relations between diameter difference and a second gain.

Now, a calculation is made at Step S54 for a diameter change or diameter difference Dd which occurs in the contact-circle enlarging pulley while the current speed change ratio is being brought to the target speed change ratio. In other words, this calculation is for how much the diameter of the belt-contact circle of the enlarging pulley will grow from the current diameter while the transmission is being brought into the target speed change ratio. Then, the diameter difference Dd, which is obtained at Step S54, is plotted in a graph as shown in FIG. 9 to determine a second gain G2 at Step S55. The second gain G2 is proportional to the diameter difference Dd for each type of shifts (upshift or downshift).

Figure 11:
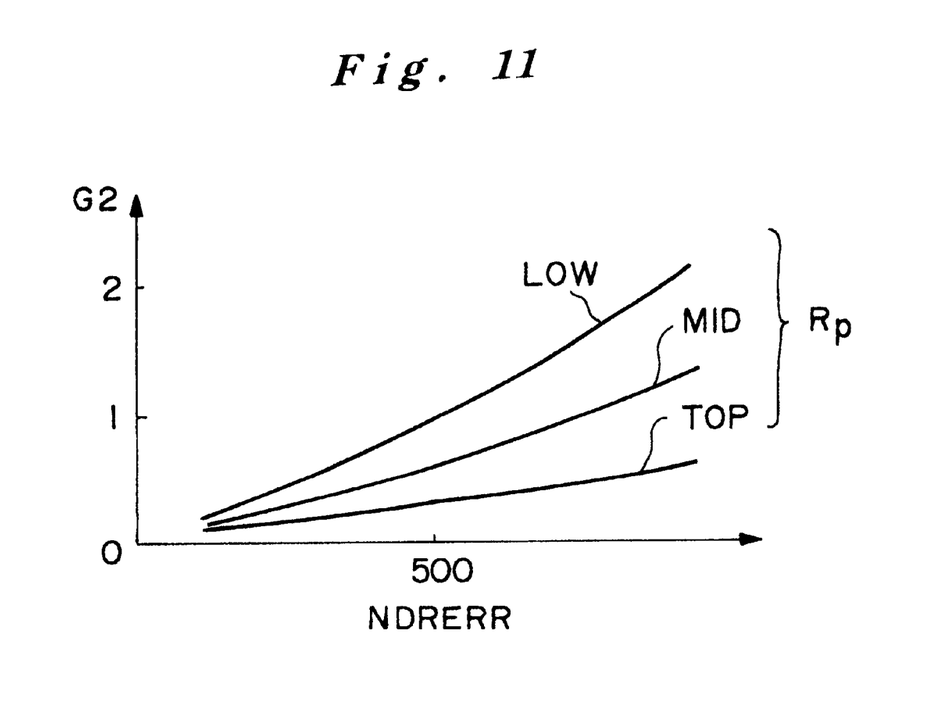
FIG. 11 is a graph describing relations among the rotational speed change of the drive pulley for the engine to achieve a target rotational speed, the speed ratio, and the second gain.

By the way, the diameter difference Dd is determinable from only the speed change ratio Rp and the difference NDRERR between the rotational speed of the drive pulley at the current engine rotational speed and the rotational speed of the drive pulley at the target engine rotational speed. Therefore, for example, as shown in FIG. 11, the values of the second gain G2 are predetermined in relation to the difference NDRERR of the rotational speeds of the drive pulley and to the speed change ratio Rp, and the second gain G2 for the current condition is determined from this predetermined relation. If the control is executed in this way, then it is not necessary to calculate the diameter difference Dd at Step S54, so the control can be simplified. As mentioned above, the second gain G2 is also determined in correspondence to the type of the shift. The relations shown in FIG. 11 are also for upshifts, and FIG. 11 shows, as examples, the relations only for a minimum speed change ratio TOP, an intermediate speed change ratio MID and a maximum speed change ratio LOW, though many additional lines which represent respective speed change ratios Rp can be drawn.

After determining the first gain G1 and the second gain G2, the control flow proceeds to Step S56, where a basic thrust Fb is multiplied by the first and second gains GI and G2 to produce a shifting additional thrust Fa. The basic thrust Fb is a thrust value which is predetermined experimentally, for example, as 200 kgw.

Figure 12:
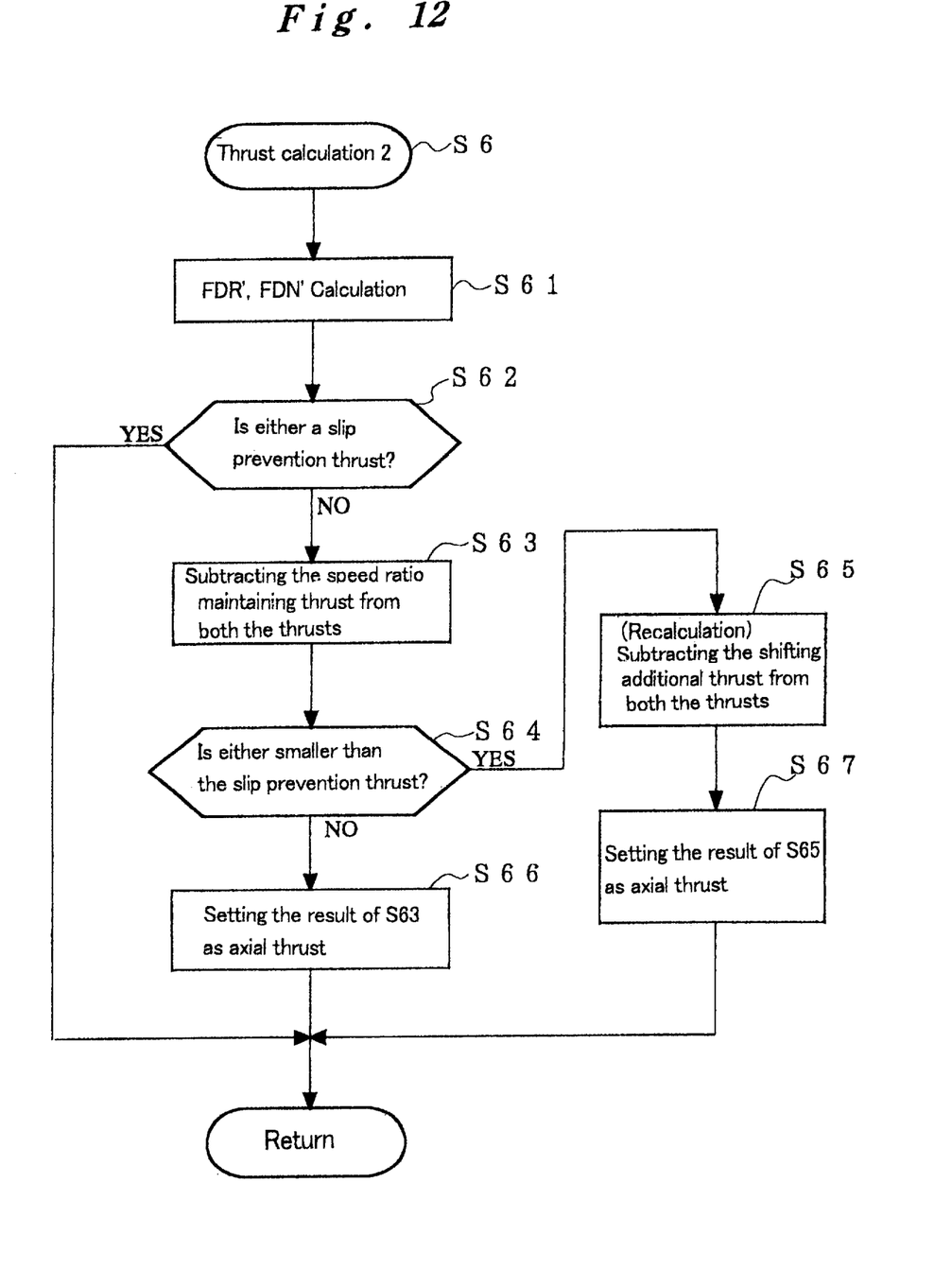
FIG. 12 is a flowchart describing "thrust calculation 2", which step is a part of the control flow shown in FIG. 2.

Now, the thrust calculation 2 executed at Step S6 shown in FIG. 2 is detailed in reference to FIG. 12. In this calculation, at Step S61, the slip prevention thrusts F1DR and F1DN for the drive and driven pulleys are added with the speed ratio maintaining thrust F2DR or F2DN, and the thrust value for the contact-circle enlarging pulley is then added with the shifting additional thrust Fa, thus calculating basic shift control thrusts FDR' and FDN' for the drive pulley and the driven pulley.

Figure 13A:
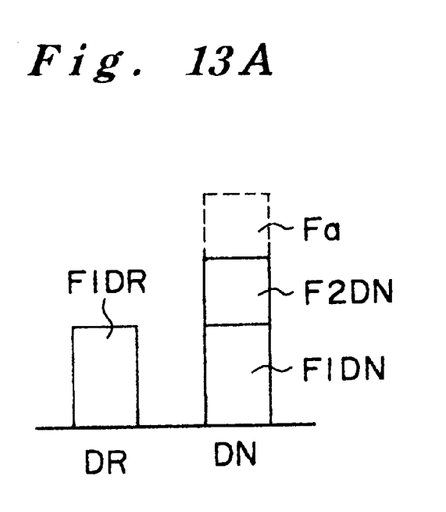
FIGS. 13A and 13B are graphs describing examples, in which the slip prevention thrust for the drive and driven pulleys are added with a speed ratio maintaining thrust and a shifting additional thrust.
Figure 13B:
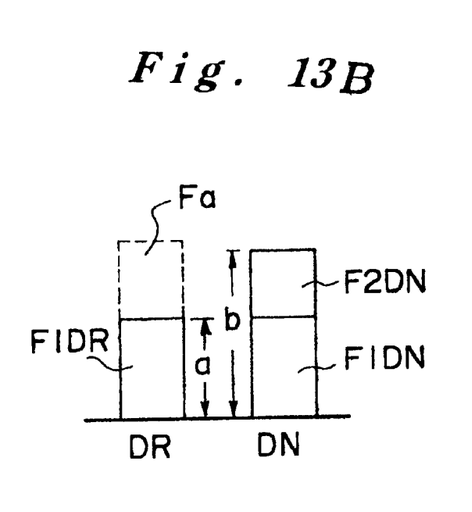

This calculation results in the following two cases. A first case is that one of the basic shift control thrusts FDR' and FDN' equals the slip prevention thrust F1DR or F1DN. For example, the basic shift control thrust for the drive pulley equals the slip prevention thrust F1DR as shown in FIG. 13A. The other case is that both the basic shift control thrusts FDR' and FDN' are greater than the slip prevention thrusts as shown in FIG. 13B. In either case, the basic shift control thrusts FDR' and FDN' can be applied respectively to the drive pulley 5 and to the driven pulley 8 to achieve the requested shift.

However, in the case described in FIG. 13B, the basic shift control thrusts for both the pulleys are greater than the slip prevention thrusts. This means that the thrusts are applied wastefully. As long as the difference between the thrusts to be applied to both the pulleys is secured, these thrusts can be reduced until one of the thrusts reaches the respective slip prevention thrust. Yet, the requested shift can be achieved without any slip and without applying the thrusts in wasteful amounts. In this way, an efficient shift control can be realized according to the present invention.

Therefore, at Step S62 in this control flow, a determination is made whether or not either of the basic shift control thrusts FDR' and FDN' equals the respective slip prevention thrust. If it is so, i.e., the case is like that shown in FIG. 13A, then the basic shift control thrusts FDR' and FDN' are set, without any change, as the drive and driven axial thrusts FDR and FDN for the drive and driven pulleys, respectively.

On the other hand, if both the basic shift control thrusts are greater than the respective slip prevention thrusts, i.e., the case is like that shown in FIG. 13B, then the control flow proceeds to Step S63. At first, the speed ratio maintaining thrust is subtracted from the basic shift control thrusts for the drive and driven pulleys. For example, in the case shown in FIG. 13B, because there is a speed ratio maintaining thrust F2DN for the driven pulley, at first, this speed ratio maintaining thrust is subtracted from the basic shift control thrust FDN' (=F1DN+F2DN) to reduce the thrust of the driven pulley to the slip prevention thrust F1DN. At the same time, the amount which corresponds to the speed ratio maintaining thrust F2DN, i.e., not the same amount as the speed ratio maintaining thrust F2DN, is subtracted from the basic shift control thrust FDR' of the drive pulley. In this case, the amount to be subtracted for the drive pulley is calculated against the speed ratio maintaining thrust F2DN in correspondence to a thrust ratio (a/b) taken for the drive and driven pulleys in constant condition, and the result of this calculation is subtracted (FDR'−F2DN×a/b).

Then, a determination is made whether or not either the axial thrust for the drive pulley or the axial thrust for the driven pulley is smaller than the respective slip prevention thrust at Step S64. The above calculation should make the thrust for the one of the pulleys for which the speed ratio maintaining thrust is set, to the level of the slip prevention thrust. However, if the thrust for the other pulley becomes smaller than the slip prevention thrust, then a slip may occur between the belt and this pulley. Therefore, to prevent slip from occurring, a determination is made whether the thrust for the other pulley is smaller than the respective slip prevention thrust. In this determination, if the axial thrust for the other pulley is greater than the slip prevention thrust, then the control flow proceeds to Step S66, where the results of the calculations are set as the drive and driven axial thrusts FDR and FDN.

On the other hand, if the result of the above determination is that the axial thrust for the other pulley is smaller than or equal to the slip prevention thrust, then the control flow proceeds to Step S65, where the amount which corresponds to the shifting additional thrust Fa is subtracted from the basic shift control thrusts FDR' and FDN' for the drive and driven pulleys, respectively, which are calculated at Step S61. The results of the calculations are set as the drive and driven axial thrusts FDR and FDN at Step S67. For example, in the case shown in FIG. 13B, the thrust for the drive pulley includes a shifting additional thrust Fa. Therefore, this shifting additional thrust Fa is subtracted from the basic shift control thrust FDR' (=F1DR+Fa) for the drive pulley to reduce the thrust for the drive pulley to the slip prevention thrust F1DR. At the same time, the amount which corresponds to the shifting additional thrust Fa is subtracted from the basic shift control thrust FDN' for the driven pulley. Also, in this case, the amount to be subtracted for the driven pulley is calculated against the shifting additional thrust Fa in correspondence to a thrust ratio (b/a) taken for the driven and drive pulleys in constant condition, and the result of this calculation is subtracted (FDN'−Fa×b/a). In this way, at least one of the axial thrusts FDR and FDN is reduced to the slip prevention thrust F1DR or F1DN, respectively, with the other thrust being a little greater. As the present invention provides this adjustment or reduction of the thrusts to be applied to the pulleys, a transmission equipped with a shift control system according to the present invention can be appropriately and advantageously incorporated into a vehicle.

After the axial thrusts FDR and FDN for the drive and driven pulleys are calculated as described above, the control flow proceeds to Step S7 shown in FIG. 2, where shift control signals are determined for the shift control valve 50 to generate these axial thrusts in the respective pulleys. Then, the shift control signals are sent from the control unit 60 to the shift control valve 50 for controlling the operation of the shift control valve 50 and thereby achieving the desired shift.

In the above embodiment, shift control is executed to achieve a target speed change ratio. However, the present invention is not limited to this way of shift control. A target engine rotational speed or a target drive pulley rotational speed can be used, instead, and the shift of the transmission is controlled to achieve the respective target value.

As described above, a shift control system according to the present invention comprises slip prevention thrust calculation means, speed ratio maintaining thrust calculation means and additional thrust calculation means. The slip prevention thrust calculation means calculates slip prevention thrusts necessary for the drive and driven pulleys to transmit the power without slip of the V belt, and the speed ratio maintaining thrust calculation means calculates a speed ratio maintaining thrust which is necessary, in addition to the slip prevention thrusts, for maintaining the current speed change ratio in constant condition and for transmitting the power without any slip of the belt. The additional thrust calculation means calculates a shifting additional thrust which is necessary for achieving a target speed change ratio and to be applied to the pulley whose belt-contact circle should be enlarged. The values of the shifting additional thrust are predetermined in proportion to the magnitude of the diameter difference between the belt-contact circles and in inverse proportion to the speed of the V belt, which is determined by belt-speed calculation means.

While the speed of the V belt is high, if the pulley widths were adjusted quickly, then the resulting shift would be too rapid. By adjusting the speed of the shift in inverse proportion to the speed of the V belt, the shift control system according to the present invention provides a shift control appropriate for comfort. Also, the larger the diameter difference between the belt-contact circles of the pulleys before and after a shift, faster the speed of the shift being required. Therefore, according to the present invention, the speed of the shift is controlled proportionally to the magnitude of the diameter difference between the belt-contact circles to achieve an appropriate shift control.

Furthermore, a first gain that is inversely proportional to the speed of the V belt, which is determined by the belt-speed calculation means, is calculated from the rotational speed of the drive pulley and the speed change ratio at present. Also, a second gain that is proportional to the magnitude of the diameter difference between the belt-contact circles is calculated from the difference between the rotational speed of the drive pulley at the present speed change ratio and the rotational speed of the drive pulley at the target speed change ratio and from the present speed change ratio. These first and second gains are preferably used as coefficients for calculating the shifting additional thrust. In this way, not only the first and second gains but also the shifting additional thrust are calculated relatively simply.

According to the present invention, the basic shift control thrusts are calculated from the slip prevention thrusts, the speed ratio maintaining thrust and the shifting additional thrust. These basic shift control thrusts can be applied in the shift control to shift the transmission into a target speed change ratio without any slip between the V belt and the pulleys. However, both the basic shift control thrusts calculated in this way can become greater than the slip prevention thrusts for the drive and driven pulleys. If such a case occurs, then both the basic shift control thrusts are reduced until either reaches the respective slip prevention thrust. The thrusts reduced in this way can be used in the shift control to achieve the same result, so the levels of the thrusts can be reduced as a whole. According to the present invention, this reduction correction is executed by the shift control thrust correction means. As a result, a relatively small energy is required to generate the thrusts applied to the drive and driven pulleys in the shift control, so fuel efficiency is improved.

As the basic shift control thrusts are calculated from the slip prevention thrusts, the speed ratio maintaining thrust and the shifting additional thrust, preferably, the shift control system may be arranged to subtract the thrust which corresponds to the speed ratio maintaining thrust from the basic shift control thrusts or to subtract the thrust which corresponds to the shifting additional thrust from the basic shift control thrusts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shift control system for a belt-type continuously variable transmission which comprises a variable width drive pulley, a variable width driven pulley, a V belt, a drive-side actuator and a driven-side actuator, said V belt being disposed around said drive and driven pulleys, said drive-side actuator generating an axial thrust to said drive pulley, and said driven-side actuator generating an axial thrust to said driven pulley, wherein said shift control system controls the drive axial thrust generated by said drive-side actuator and the driven axial thrust generated by said driven-side actuator to vary the widths of said drive and driven pulleys for achieving a shift to a target speed change ratio; said shift control system comprising:

contact-circle enlarging pulley determination means for determining which pulley, of said drive pulley or said driven pulley, is to be a contact-circle enlarging pulley whose diameter of a contact circle around which said V belt is disposed is enlarged when the widths are varied in shift control; and additional thrust calculation means for calculating a shifting additional thrust which is added to the axial thrust for said contact-circle enlarging pulley to achieve said shift to said target speed change ratio.

2. The shift control system as set forth in claim 1, wherein said shifting additional thrust is inversely proportional to running speed of said V belt.

3. The shift control system as set forth in claim 1, wherein said shifting additional thrust is proportional to difference between the diameter of the contact circle of said contact-circle enlarging pulley at present and the diameter of the contact circle of said contact-circle enlarging pulley after said shift to said target speed change ratio.

4. The shift control system as set forth in claim 3, further comprising:

diameter-change calculation means for calculating said difference between the diameter of the contact circle of said contact-circle enlarging pulley at present and the diameter of the contact circle of said contact-circle enlarging pulley after said shift to said target speed change ratio; and second gain coefficient calculation means for calculating a second gain coefficient, which is proportional to said difference between the diameters of the contact circles;

wherein:
said additional thrust calculation means uses said second gain coefficient for calculating said shifting additional thrust.

5. The shift control system as set forth in claim 1, further comprising:

belt-speed calculation means for calculating the running speed of said V belt; and first gain coefficient calculation means for calculating a first gain coefficient, which is inversely proportional to the running speed of said V belt;

wherein:
said additional thrust calculation means uses said first gain coefficient for calculating said shifting additional thrust.

6. The shift control system as set forth in claim 1, further comprising:

belt-speed calculation means for calculating the running speed of said V belt; and first gain coefficient calculation means for calculating a first gain coefficient from a rotational speed of said drive pulley and a current speed change ratio, said first gain coefficient being inversely proportional to the running speed of said V belt;

wherein:
said additional thrust calculation means uses said first gain coefficient for calculating said shifting additional thrust.

7. The shift control system as set forth in claim 6, wherein said shifting additional thrust is proportional to the difference between the diameter of the contact circle of said contact-circle enlarging pulley at present and the diameter of the contact circle of said contact-circle enlarging pulley after said shift to said target speed change ratio.

8. The shift control system as set forth in claim 7, further comprising:

diameter-change calculation means for calculating said difference between the diameter of the contact circle of said contact-circle enlarging pulley at present and the diameter of the contact circle of said contact-circle enlarging pulley after said shift to said target speed change ratio; and second gain coefficient calculation means for calculating a second gain coefficient, which is proportional to said difference between the diameters of the contact circles;

wherein:
said additional thrust calculation means uses said second gain coefficient for calculating said shifting additional thrust.

9. The shift control system as set forth in claim 8, wherein:

said difference between the diameter of the contact circle of said contact-circle enlarging pulley at present and the diameter of the contact circle of said contact-circle enlarging pulley after said shift to said target speed change ratio is calculated on a basis of the current speed change ratio and difference between the rotational speed of said drive pulley at the current speed change ratio and the rotational speed of said drive pulley at said target speed change ratio.

10. The shift control system as set forth in claim 1, further comprising:

belt-speed calculation means for calculating the running speed of said V belt;

diameter-change calculation means for calculating the difference between the diameter of the contact circle of said contact-circle enlarging pulley at present and the diameter of the contact circle of said contact-circle enlarging pulley after said shift to said target speed change ratio;

slip prevention thrust calculation means for calculating a slip prevention thrust necessary for transmitting power through said V belt without slip between said V belt and said drive and driven pulleys; and speed ratio maintaining thrust calculation means for calculating a speed ratio maintaining thrust which is necessary, in addition to said slip prevention thrust, for maintaining the current speed change ratio in constant condition and for transmitting the power without any slip of said belt.

11. The shift control system as set forth in claim 10, wherein said shifting additional thrust is set inversely proportional to the running speed of said V belt, which is determined by said belt-speed calculation means, and set proportional to said difference between the diameters of the contact circles of said contact-circle enlarging pulley at present and after said shift to said target speed change.

12. The shift control system as set forth in claim 1, further comprising:

slip prevention thrust calculation means for calculating a slip prevention thrust necessary for transmitting power through said V belt without slip between said V belt and said drive and driven pulleys;

wherein:
for said shift, the axial thrust for a contact-circle contracting pulley is set to said slip prevention thrust; and the axial thrust for said contact-circle enlarging pulley is set to a thrust that is calculated by adding to said shifting additional thrust a product which is obtained by multiplying said slip prevention thrust by a ratio of thrusts for said drive and driven pulleys, respectively, obtained in constant condition.

13. The shift control system as set forth in claim 1, further comprising:

slip prevention thrust calculation means for calculating a slip prevention thrust necessary for transmitting power through said V belt without slip between said V belt and said drive and driven pulleys;

wherein:
for said shift, the axial thrust for said contact-circle enlarging pulley is set to said slip prevention thrust; and the axial thrust for a contact-circle contracting pulley is set to a thrust that is calculated by multiplying a result obtained by subtracting said shifting additional thrust from said slip prevention thrust by a ratio of thrusts for said drive and driven pulleys, respectively, obtained in constant condition.

14. The shift control system as set forth in claim 1, further comprising:

slip prevention thrust calculation means for calculating a slip prevention thrust necessary for transmitting power through said V belt without slip between said V belt and said drive and driven pulleys;

speed ratio maintaining thrust calculation means for calculating a speed ratio maintaining thrust, which is added to said slip prevention thrust of either said drive pulley or said driven pulley, for maintaining the current speed change ratio in constant condition and for transmitting the power through said V belt without any slip of said belt;

basic shift control thrust calculation means for calculating basic shift control thrusts which are to be applied to said drive and driven pulleys for said shift to said target speed change ratio, on a basis of said slip prevention thrust, said speed ratio maintaining thrust and said shifting additional thrust; and shift control thrust correction means for executing a correction in which said basic shift control thrusts are reduced until the thrust for either said drive pulley or said driven pulley becomes equal to said slip prevention thrust with the thrust for the other pulley being equal to or greater than said slip prevention thrust.

\* \* \* \* \*